Reissued Apr. 14, 1942

Re. 22,071

UNITED STATES PATENT OFFICE 22,071

PROCESS OF NORMALIZING HOT PRESSED PLYWOOD

James V. Nevin, Aberdeen, Wash.

No Drawing. Original No. 2,150,841, dated March 14, 1939, Serial No. 199,585, April 2, 1938.

Application for reissue July 31, 1940, Serial No. 348,921

7 Claims. (Cl. 21—9)

This invention relates to a method of treating plywood panels.

More specifically this invention relates to a process of relieving the stresses in hot pressed plywood panels to prevent the same from checking and warping.

In the manufacture of hot pressed plywood the wooden veneer sheets with thermo-setting glue-coated core sheets or cross banding therebetween are heated under pressure between the platens of a press. This heat and pressure treatment converts the thermo-setting glue into an insoluble and infusible bonding agent permanently welding the veneer sheets to the cores or cross banding and forming a plywood panel. This hot pressing operation expands the wooden veneer sheets and cores and since the operation is usually carried out at temperatures above 212° F., the moisture content of the wood is also greatly reduced.

The expansion of the wood veneers and cores is greatest across the grain of the wood so that when the plywood panels are cooled after the glue sets, stresses will occur along the glue line of the panel. These stresses will build up or accumulate until a check or crack is formed along the glue line. Such checks or cracks, of course, greatly diminish the shear strength of the panel. If the panels are then subjected to weather conditions or to other than substantially bone dry atmospheres, they will warp and blister, due to an uneven moisture absorption into the wood.

I have found that hot pressed plywood panels can be normalized to prevent the formation of checks and blisters and to forestall possible future warping. In accordance with this invention the hot pressed plywood panels are heat-treated in a hot, humid atmosphere immediately after the hot pressing operation and before the same have cooled. This treatment plasticizes and softens the wood along the glue line to relieve stresses. At the same time, the wood absorbs moisture from the humid atmosphere so that it will not warp under any weather conditions.

Humidification or treatment of the hot pressed panels in a moist atmosphere is not sufficient to normalize the panels. I have found that the humid atmosphere must be heated. A temperature range of from 150° to 210° F. is desirable. The humidity of this atmosphere should be maintained as high as possible without actually condensing water on the panels. A relative humidity around 98% is desirable.

It is, then, an object of this invention to normalize hot pressed plywood panels.

A further object of this invention is to treat hot pressed plywood panels for relieving stresses developed during the hot pressing operation and for imparting a moisture content to the wooden veneers and cores that will forestall warping of the panels.

Another object of this invention is to heat treat hot pressed plywood panels in a humid atmosphere immediately after the hot pressing operation.

Other and further objects of the invention will become apparent to those skilled in the art from the following detailed description of the preferred process and from the appended claims.

Natural wood veneer sheets to be used in the manufacture of hot pressed plywood panels are prepared in the usual way by peeling wooden logs on a lathe and then drying the resulting peeled sheets. The sheets are dried to a moisture content between 2 and 4%.

The sheets selected for plywood cores or cross banding are coated on both broad faces thereof with an aqueous solution of a cresylic acid-formaldehyde partial condensation product. The condensation product is prepared by reacting metacresylic acid (meta-cresol) and formaldehyde exothermically in the presence of caustic soda until somewhat constant temperatures around 208° F. are reached. The reaction is then arrested by the incorporation of a weak aqueous alkaline solution of sodium hydroxide. To insure the preparation of a condensation product that is soluble in water in all proportions, the ratio of sodium hydroxide to meta-cresol should not be less than 16 to 100 parts by weight. Equivalent amounts of other alkali metal hydroxides can be used.

The aqueous resin solution is preferably applied to the core sheet by a series of coating operations. Each coating is dried to a desired moisture content and the final coating may be utilized to impart a desired moisture content at the glue line of the plywood panel during the hot pressing operation.

The core sheets are sandwiched between veneer sheets to form a stack of the desired number of plies. The stack is then placed between the platens of a hot press. The press is heated to temperatures around 330° F. for converting the meta-cresol-formaldehyde resin into a hard, infusible and insoluble binder permanently uniting the veneers to the core. The stacks or piles in the press are subjected to pressure varying with the nature of the wood. Pressures of 120 lbs. per square inch are used for Redwood veneer sheets, while pressures around 175 lbs. per square inch are used for Douglas fir sheets.

During the hot pressing treatment the wooden sheets are heated to temperatures somewhat lower than the temperatures of the hot platens. This causes a drying of the wood as well as an expansion of the same. The wood will expand crosswise of its grain to a much greater extent than the expansion along the grain. Since adjoining sheets are arranged with the grains thereof running at right angles to each other, stresses will occur along the glue lines between the sheets.

After the resin has set, due to the hot pressing operation, the panels are removed from the presses and, in accordance with this invention, are placed in kilns where they are heat-treated in humid atmospheres before they cool.

The panels are preferably stacked between racks and weighted to keep them in a flat condition while in the kilns.

The kiln is heated to temperatures between 150° to 210° F. and the atmosphere therein is maintained at a high relative humidity. A relative humidity of from 90 to 98% is desirable.

The panels remain in the kiln until the moisture content thereof is raised preferably to above 6%. A range of 6 to 12% moisture content is desirable for the normalized product. The amount of time that the panels must remain in the kiln depends upon the number of plies in the panel and the thickness of the panel. The following table will illustrate a suitable schedule for the normalizing operation on three, five and seven-ply panels:

| Number of plies in panel | Thickness of panel | Weight of panel entering kiln | Number of hours humidified | Weight of panel leaving kiln | Percent moisture content of panel |
|---|---|---|---|---|---|
| | *Inch* | | | | |
| 3 | 5/16 | 107.50 | 14 | 113.50 | 7.58 |
| 5 | 9/16 | 157.50 | 19 | 166.00 | 8.03 |
| 7 | 13/16 | 209.00 | 36 | 219.00 | 6.91 |

After treatment at elevated temperatures in the humid atmosphere until the desired moisture content has been reached in the panels, the same are cooled gradually before removal from the kiln. The panel should be cooled to temperatures not above 150° F. before they are removed from the kiln.

From the above description it should be understood that this invention relates to the normalizing of hot pressed plywood panels at elevated temperatures in humid atmospheres to impart a moisture content between 6 to 12% to the panels. The humid atmosphere treatment must be carried out at elevated temperatures to plasticize and soften the wood so that stresses set up during the hot pressing operation are relieved.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. The method of normalizing hot pressed plywood panels composed of a plurality of bonded-together wood plies with adjoining plies having the grains thereof running at an angle to each other which comprises placing the panels while still in a heated condition from the hot pressing plywood operation into a humid, heated atmosphere until the panels absorb an appreciable amount of moisture and then slowly cooling the panels before removing the same from said heated atmosphere.

2. The method of normalizing hot pressed plywood panels composed of a plurality of bonded-together wood plies with adjoining plies having the grains thereof running at an angle to each other which comprises treating the panels while still in a heated and expanded condition from the hot pressing operation in an atmosphere heated between 150 to 210° F. and having a high relative humidity until said panels have a moisture content of from 6 to 12%, and thereafter gradually cooling the panels before removal from the heated atmosphere.

3. The method of normalizing hot pressed plywood panels composed of a plurality of bonded-together wood plies with adjoining plies having the grains thereof running at an angle to each other to relieve stresses set up in the panels during the hot pressing operation and to humidify the panels for preventing subsequent warping which comprises introducing the hot pressed panels while the same are still in a heated condition into a humid atmosphere maintained at temperatures between 150 and 210° F. until the panels have a moisture content of at least 6%.

4. The process of normalizing hot pressed plywood panels composed of a plurality of bonded-together wood plies with adjoining plies having the grains thereof running at an angle to each other which comprises heat treating the panels while still in a heated and expanded condition from the hot pressing operation at temperatures between 150 to 210° F. in a humid atmosphere having a relative humidity of from 90 to 98% until said panels have a moisture content not below 6%.

5. The method of normalizing hot pressed plywood panels composed of a plurality of bonded-together wood plies with the grains of adjoining plies running at a substantial angle to each other, which comprises introducing the panels while still in a heated condition from the hot pressing operation into a kiln in contact with an atmosphere of high relative humidity, maintaining such contact between said panels at an elevated temperature and said humid atmosphere until said panels have absorbed at least 6% of moisture and cooling said panels before removing the same from said kiln.

6. The process of normalizing hot pressed plywood panels composed of a plurality of bonded-together wood plies with adjoining plies having the grains thereof running at an angle to each other which comprises surrounding the panels while still in a heated condition from the hot pressing operation with a humid, heated atmosphere until the panels absorb an appreciable amount of moisture and slowly cooling the panels before removing the same from said atmosphere.

7. The method of normalizing hot pressed plywood panels composed of a plurality of bonded-together wood plies with adjoining plies having the grains thereof running at an angle to each other which comprises surrounding the panels while still in a heated condition from the hot pressing operation with a humid atmosphere, maintaining contact between said panels at an elevated temperature and said humid atmosphere until the panels absorb an appreciable amount of moisture, and cooling said panels before removing the same from said atmosphere.

JAMES V. NEVIN.